Aug 5, 1941.  F. S. DENISON ET AL  2,251,483
AUTOMATIC CONTROL FOR STOKERS
Filed Jan. 8, 1938
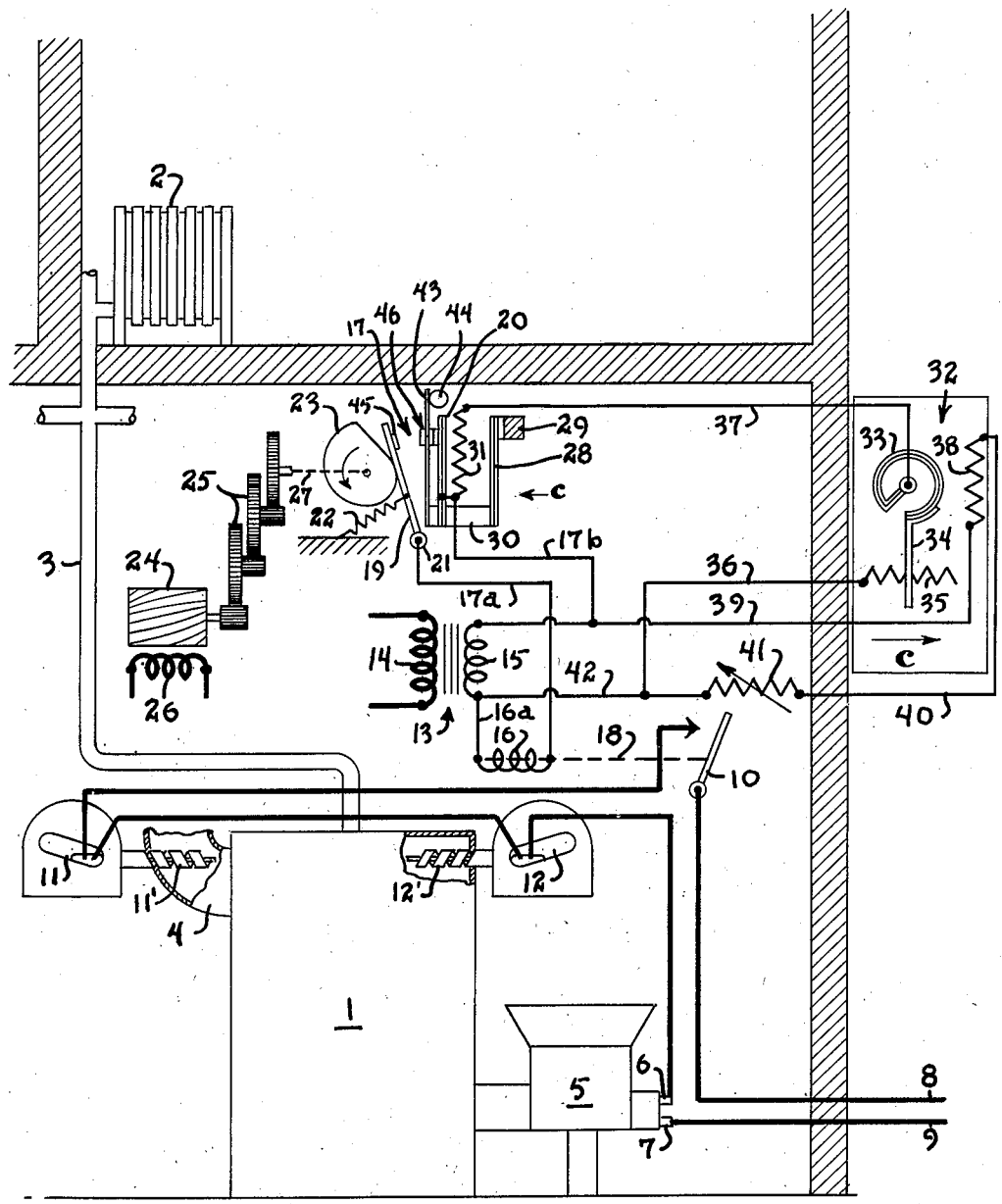
Elmer K. Scoggin
Frederick S. Denison
INVENTORS
BY George H. Fisher
ATTORNEY

Patented Aug. 5, 1941

2,251,483

UNITED STATES PATENT OFFICE 2,251,483

AUTOMATIC CONTROL FOR STOKERS

Frederick S. Denison and Elmer K. Scoggin, Minneapolis, Minn., assignors to Minneapolis-Honeywell Regulator Company, Minneapolis, Minn., a corporation of Delaware Application January 8, 1938, Serial No. 183,930

6 Claims. (Cl. 236—91)

The present invention relates to automatic apparatus for regulating the delivery of fuel to furnaces and the like, and is more particularly concerned with control mechanism for automatically governing the duration of fuel delivery periods of automatic stokers in accordance with changes in temperature.

Our invention is intended primarily to be applied to automatic stokers for feeding a solid fuel, such as coal or the like, to a furnace or boiler. Such stokers always feed at the same rate and it is customary to operate them intermittently, that is, only at intervals, so as to provide for a rate of combustion which will satisfy the heating load demands as determined by various factors, particularly outdoor weather conditions.

In homes or dwellings an ordinary thermostat for controlling the heating system generally proves satisfactory but in apartment houses and the like outdoor thermostats are more applicable because an indoor thermostat does not satisfactorily meet requirements. In an apartment house for example, it is a difficult problem to locate an indoor thermostat so that all apartments of the building will be maintained at a proper temperature because of the variation in heat leakage from different apartments as determined by their situation with respect to the elements, such as sunlight, wind direction, etc. On the other hand, an outdoor thermostat leaves something to be desired because in an apartment house or the like all apartments will not be properly heated at all times because of the wide variation in heat losses due to the size of the building, the large number of windows and occupants, etc., which cannot be compensated for by an outdoor thermostat.

It is an object of our invention to provide a heating control system so constructed and arranged that an inexpensive and simple type outdoor thermostat will properly control heating and consistently maintain a desired predetermined temperature in buildings particularly in apartments or the like. This object is accomplished by providing an indoor compensating device which may be of a very simple and inexpensive nature, for example, a bimetal element and which may be located in the basement of the building. This object of our invention provides for accomplishment of compensation for variations in heating load not due to changes in outdoor temperature by means characterized by simplicity of construction and economy of manufacture and obviates the need of indoor thermostats, their attendant electrical wiring, and the problem of locating such thermostats.

Another object of our invention is the provision of means for automatically regulating the duration of operating periods of a stoker in accordance with outdoor temperatures as compensated by indoor temperatures.

Another object is to provide a simple but reliable stoker control system responsive to an outdoor thermostat for varying the duration of stoking periods in accordance with outdoor temperature as compensated by indoor temperature and for maintaining a fire in the furnace when no heating is needed.

A further object is to provide a novel cam operated switching device governed by indoor and outdoor temperatures for operating a stoker accordingly and for additionally operating the stoker at timed intervals when no heating is necessary.

A further object of the invention is the provision of a stoker control device having extremely simple and reliable means for operating the stoker at timed intervals for maintaining a fire when no heating is needed, the arrangement being such that after any stoking period, a timed interval must elapse before a stoking period for fire maintaining purposes may take place. The attainment of this object prevents a timed stoking period for fire maintaining purposes being started immediately after the expiration of or overlapping with a stoking period inaugurated by the thermostatic controls and consequent overshooting. In heretofore known stoker control systems the above undesirable characteristic prevailed and in systems constructed to avoid such prolonged stoking periods complex and expensive apparatus was employed. Our object is to avoid the defect employing unusually inexpensive and simple mechanism to do so as well as to maintain a predetermined temperature as stated above.

Other objects and advantages of the invention will become apparent from the attached drawing and description.

The drawing represents more or less diagrammatically a heating system having an automatic stoker and our improved control arrangement applied thereto for regulating the stoker.

The single figure of the drawing shows more or less diagrammatically a portion of a building having a steam or hot water heating system of conventional type. The heating system includes a furnace or boiler 1 and a radiator 2 in a room of the building, and having the usual piping connections 3. The system may be of a type employing a single pipe for conveying heated fluid to and from the radiators or separate risers leading to the radiators and return pipes may be used.

The furnace or boiler 1 has a pipe or flue indicated at 4 for draft purposes and for conveying away the burnt gases of combustion and an automatic stoking device of conventional type, diagrammatically indicated at 5. The stoker 5 includes mechanism for automatically feeding solid fuel, such as coal, to the combustion chamber of the furnace and an electric motor for operating the stoking mechanism. The electric operating motor for the stoker has terminals 6 and 7 for connection with electrical conductors 8 and 9 connecting with an external source of electrical supply (not shown).

As shown in the figure, one side 9, of the line connects directly to the stoker motor, while in the other side 8 of the line are automatic switches 10, 11 and 12. Switches 11 and 12 are thermostatically operated mercury type switches of conventional type which act as safety or high and low limit temperature devices. Switches 11 and 12 are in series, switch 11 being operated by a thermostatic element 11' located in the flue 4 of the furnace. Switch 11 and its associated temperature responsive element 11' are arranged to break the circuit to the stoker motor at an abnormally low flue temperature such as would occur when the fire in the furnace becomes accidentally extinguished. Thus the stoker is prevented from feeding raw fuel into the combustion chamber when the fire is out.

Switch 12 is operated by a thermostatic element 12' similar to 11' which is located in or adjacent the boiler so as to be responsive to boiler water temperatures. Switch 12 operates to break the circuit to the stoker motor and discontinue the fuel supply to the furnace when the boiler water temperature becomes unduly high.

Switch 10 is operated by a relay mechanism to automatically energize and deenergize the stoker motor at intervals and the control of this relay forms the principal subject matter of this invention.

The switch 10 is operated by a relay coil 16 which controls a solenoid directly connected by mechanical means indicated diagrammatically by the broken line 18 to the switch arm 10. Energization of the relay coil 16 operates in a conventional and well-known manner to move switch arm 10 to the left, thus closing the switch 10, while deenergization of the coil 16 operates to open the switch 10. The stoker motor is energized whenever switch 10 is closed providing that switches 11 and 12 are in closed position.

Numeral 13 represents generally a transformer having a primary winding 14 and a secondary winding 15. The transformer is of the voltage step-down type having a greater number of turns in the primary winding than in the secondary. The relay coil 16 receives its energy from the secondary winding 15 of the transformer as will be described. One end of the relay coil winding 16 is connected by conductor 16a to one side of the secondary winding 15. The other end of the winding 16 is connected by a conductor 17a to the pivoted end 21 of a switch arm 19 which forms part of the switching device generally indicated at 17. The switching device 17 includes a flexible metal blade 43 having a contact 46 which is conductively connected at its lower portion to a bimetallic element 20. The lower end of element 20 is secured to a block 30 forming a support for the element. The block 30 is in turn supported by another bimetallic thermostatic element 28 which is rigidly supported at 29 as shown. Adjacent the bimetallic element 20 is an electrical heating resistance 31, one end of which is connected to the element 20 and to winding 15 by conductor 17b and a portion of conductor 39 as shown. Element 20 is responsive to the temperature of the heating resistance 31 and element 28 is responsive to circumambient temperatures. Both the element 20 and element 28 warp to the left upon a fall in temperature as indicated on the drawing, the element 20 being bodily moved when the element 28 warps. The switch blade 43 may be moved by warping of the elements 20 and 28 but movement of the upper end of switch blade 43 to the right is limited by a stop member indicated at 44. The contact 45 associated with switch arm 19 is brought into engagement with the contact 46 by operation of a cam indicated at 23. Closure of these contacts completes an electrical circuit through the winding 16. It will be thus seen that when the contacts 45 and 46 are closed the coil winding 16 is energized, causing closure of switch 10 and operation of the stoker.

Switch arm 19 which is pivoted at 21 is biased by tension spring 22 as shown, so as to act as a cam follower for the cam 23. A major portion of the periphery of cam 23 has a spiral of voluted contour. Another portion of the periphery of the cam forms a flat surface as shown. Obviously, rotation of the cam causes the switch arm 19 to be moved progressively further away from the center of the cam until the flat portion of the cam contour is reached, whereupon the tension spring 22 causes the arm 19 to be drawn towards the center of the cam. Thus the point in a revolution of cam 23 at which contact 45 engages contact 46 is determined by the position of contact 46, the duration of closure of the contacts being at a minimum when switch blade 43 is in contact with stop 44.

The cam 23 is driven by a timing motor 24 through a gear train diagrammatically indicated at 25. The timing motor is preferably electrically driven, having a winding 26, but it is to be understood that it may be a motor of other suitable type. The mechanical connection between the gear train 25 and cam 23 is diagrammatically indicated by a broken line 27.

The heating resistance 31 is connected at its lower end by conductor 17b to a conductor 39 as above described. The upper end of resistance 31 is connected by a conductor 37 to an outdoor thermostatic device generally indicated at 32. The outdoor thermostatic device includes a slide wire resistance 35 which is connected by conductors 36 and 42 to one end of the secondary winding 15 of the transformer 13. Thus it is seen that the heating resistance 31 is energized by the secondary of the transformer through a circuit including the outdoor thermostat.

The outdoor thermostatic device is located within a suitable enclosure exterior to the building and comprises a bimetallic circularly arranged element 33 of conventional type having an arm 34 movable to the right or left in response to temperature changes affecting the element. The arm 34 forms the contact for slide wire resistance 35, a part of which is in circuit with heating resistance 31 as above described.

On a decrease in outdoor temperature or, that is, a temperature within the enclosure in which the outdoor thermostat is located, the thermostatic element 33 operates to cause contact arm 34 to move to the right thereby increasing the amount of resistance in the circuit through resistance 31 and thereby reducing the heating at resistance 31. Obviously, bimetallic element 20 being adjacent to the heating resistance 31, it is responsive to the temperature thereof and consequently is responsive in its movements to outdoor temperature. From the foregoing it will be seen that switch contact 46 may be positioned in response to outdoor temperature as compensated by indoor temperature affecting element 28 whenever switch blade 43 is not engaging the stop 44.

Located within the enclosure containing the outdoor thermostatic device so as to heat the interior thereof, is a heating resistance 38, one end of which is connected to one terminal of the secondary winding 15 of transformer 13 by a conductor 39, as shown. The other end of the heating resistance 38 is connected by a conductor 40 to a variable resistance 41 which is in turn connected by a conductor 42 to the other terminal of the secondary winding 15. The variable resistance 41 provides for adjusting the amount of heating at resistance 38 so that the temperature within the enclosure is always above outdoor temperature. This provides for a continuous path of heat flow from the interior to the exterior of the enclosure. Among the purposes of the resistance 38 is to provide means for compensating for such outdoor weather conditions as direction and velocity of the wind, solar radiation and the like. It is well known that the heat losses from a building will vary with wind conditions and with the amount of solar radiation on particular types and the amount of heat necessary to be supplied to the building to maintain a predetermined indoor temperature will vary accordingly. The temperature within the enclosure housing the outdoor thermostat will vary in accordance with the rate of heat dissipation from the interior to the exterior and this rate will vary in accordance with the above described conditions. Thus it is seen that by properly adjusting the variable resistance 41 the heating resistance 38 provides compensation for the above mentioned outdoor weather conditions, inasmuch as the thermostatic element 33 responds to the temperature within the enclosure which is varied by outdoor conditions as described. The resistances 41 and 38 also provide a means for calibrating the outdoor thermostatic device. The resistance 41 may be adjusted to vary the temperature differential between the interior and exterior of the enclosure housing the outdoor thermostat. Thus the rate of heat dissipation from the interior to the exterior of the enclosure may be made to correspond to the rate of heat losses of the particular building which is being heated. Thus the heating at resistance 38 can be adjusted so that the thermostatic element 33 gives the exact response necessary to control the heating system to provide just sufficient heat to maintain the desired indoor temperature. Adjustment of resistance 41 is in practice made at time of installation so that the thermostatic element 33 reacts in response to outdoor conditions in a manner to properly control the heating system for the particular building being heated.

With the parts in the position shown in the drawing, the outdoor temperature is at a value such that no heating is required of the system. The indoor temperature is also at the proper value and therefore the switch blade 43 has just come in contact with the stop member 44. The timing motor 24 and gear train 25 may be arranged so that cam 23 makes one complete revolution in a half an hour or similar period of time. The cam 23 closes the switch contacts 45 and 46 once during each revolution and keeps them closed for a period of time depending upon the position of contact 46. When the switch blade 43 is in contact with the stop 44 the contacts 45 and 46 are closed for a minimum period of time which may be two or three minutes during each revolution of the cam. Thus when no heating is required relatively short timed stoking periods are provided for which will supply the furnace with sufficient fuel to keep the fire from going out.

Whenever the outdoor temperature falls to a value indicating that heat should be supplied to the building element 20 will be warped to the left thereby moving switch blade 43 and contact 46 to the left so that the duration of closure of the contacts and consequently of the firing periods will be lengthened accordingly. The outdoor thermostat will regulate the firing periods in accordance with the load as determined by outdoor temperatures. The thermostatic element 28 operates to compensate for any variation in indoor temperatures by modifying the position of element 20 and contact 46 so that there will be no variations in the indoor temperature due to other factors than changes in the outdoor temperature. It will be obvious that whenever temperature conditions are high enough so that no heating is needed in the building the elements 20 and 28 may warp farther to the right than shown in the drawing. Under these conditions the switch blade 43 will obviously remain in a fixed position against the stop 44.

From the foregoing it should be apparent that our invention provides an extremely simple combustion control arrangement which will efficiently and economically control heating. An inexpensive type apparatus is employed of a type which does not readily get out of order and the rate of heating is regulated in accordance with outdoor temperature thereby avoiding unnecessary firing and consequently waste of fuel. Variations in indoor temperature often experienced in the past particularly in larger buildings such as apartments are avoided by a very simple and efficient mechanism which automatically compensates for variations. Our invention provides for minimum firing intervals which are lengthened in accordance with heating requirements. The minimum firing intervals provide for maintaining the fire when no heating is needed and the nature of the construction is such that one of these timed minimum intervals cannot occur after a firing interval brought about in response to thermostatic demands until after a predetermined time has elapsed. Thus the undesirable characteristic of having a timed stoking interval occur immediately or shortly after the thermostats have become satisfied is avoided and consequently there is no overshooting.

There are many variations, modifications, and forms which our invention may take and it is to be understood that the present embodiment is to be interpreted as illustrative only and the invention is to be limited only by the scope of the appended claims.

We claim as our invention:

1. In a heating system, in combination, means forming a combustion chamber adapted to contain solid fuel, an automatic stoker for feeding solid fuel into the combustion chamber, control apparatus for the stoker comprising timing means, means responsive to outdoor temperature and cooperating with the timing means for operating the stoker intermittently for periods of duration depending on outdoor temperature for normally maintaining a predetermined indoor temperature, means cooperating with the timing means whereby the stoker is intermittently operated for intervals of duration just sufficient to maintain a fire in the combustion chamber when no heating is required, said fire maintaining means being independent of temperature, and means responsive to indoor temperature cooperating with said timing means and outdoor temperature responsive means for varying the duration of said periods when the indoor temperature deviates from the predetermined value to be maintained.

2. In a heating system, in combination, means forming a combustion chamber adapted to contain solid fuel, an automatic stoker for feeding solid fuel into the combustion chamber, control apparatus for the stoker comprising timing means, means responsive to outdoor temperature and cooperating with the timing means for operating the stoker intermittently for periods of duration depending on outdoor temperature for normally maintaining a predetermined indoor temperature, means cooperating with the timing means whereby the stoker is intermittently operated for intervals of duration just sufficient to maintain a fire in the combustion chamber when no heating is required, said fire maintaining means being independent of temperature, means responsive to indoor temperature cooperating with said timing means for varying the duration of said periods when the indoor temperature deviates from the predetermined value to be maintained, and means responsive to a condition indicative of the absence of combustion in the combustion chamber for terminating operation of the stoker and preventing automatic resumption of operation of the stoker.

3. In a heating system, in combination, means forming a combustion chamber adapted to contain solid fuel, an automatic stoker for feeding solid fuel into the combustion chamber, control apparatus for the stoker comprising timing means, automatic contacting means driven by the timing means for intermittently operating said stoker, said contacting means being so arranged that said stoker is intermittently operated for periods of duration sufficient to maintain a fire irrespective of temperature, means responsive to outdoor temperature cooperating with the timing means and contacting means for operating the stoker for periods of duration depending on outdoor temperature for normally maintaining a predetermined indoor temperature, and means responsive to indoor temperature cooperating with said timing means, outdoor temperature responsive means, and contacting means for varying the duration of the operating periods of the stoker when the indoor temperature deviates from the predetermined value to be maintained.

4. In a heating system, in combination, means forming a combustion chamber adapted to contain solid fuel, an automatic stoker for feeding solid fuel into the combustion chamber, control apparatus for the stoker comprising timing means, automatic contacting means driven by the timing means for intermittently operating said stoker, said contacting means being so arranged that said stoker is intermittently operated for periods of duration sufficient to maintain a fire irrespective of temperature, means responsive to outdoor temperature cooperating with the timing means and contacting means for operating the stoker for periods of duration depending on outdoor temperature for normally maintaining a predetermined indoor temperature means, and means responsive to indoor temperature cooperating with said timing means, outdoor temperature responsive means, and contacting means for varying the duration of the operating periods of the stoker when the indoor temperature deviates from the predetermined value to be maintained, and means responsive to a condition indicative of the absence of combustion in the combustion chamber for terminating operation of the stoker and preventing automatic resumption of operation thereof.

5. In a heating system, in combination, means forming a combustion chamber adapted to contain solid fuel, an automatic stoker for feeding solid fuel into the combustion chamber, control apparatus for the stoker comprising timing means, a cam driven thereby, a first contact movable by said cam, a movable second contact engageable by said first contact, means limiting the movement of said second contact whereby said contacts are effective to intermittently operate said stoker for periods of minimum duration irrespective of temperature, means responsive to outdoor temperature cooperating with said second contact for lengthening the operating periods of the stoker in accordance with outdoor temperature whereby normally a predetermined indoor temperature is maintained, and means responsive to indoor temperature cooperating with said outdoor temperature responsive means for modifying the duration of the operating periods of the stoker when the indoor temperature deviates from the predetermined value to be maintained.

6. In a heating system, in combination, means forming a combustion chamber adapted to contain solid fuel, an automatic stoker for feeding solid fuel into the combustion chamber, control apparatus for the stoker comprising timing means, a cam driven thereby, a first contact movable by said cam, a movable second contact engageable by said first contact, means limiting the movement of said second contact whereby said contacts are effective to intermittently operate said stoker for periods of minimum duration irrespective of temperature, means responsive to outdoor temperature cooperating with said second contact for lengthening the operating periods of the stoker in accordance with outdoor temperature whereby normally a predetermined indoor temperature is maintained, said timing means and contacts being located indoors and having means responsive to indoor temperature cooperating with said outdoor temperature responsive means for modifying the duration of the operating periods of the stoker when the indoor temperature deviates from the predetermined value to be maintained.

FREDERICK S. DENISON.
ELMER K. SCOGGIN.